Feb. 20, 1940.  E. FISCHEL  2,191,250
SYSTEM FOR THE AUTOMATIC CONTROL OF AIRPLANES
Filed Sept. 4, 1935
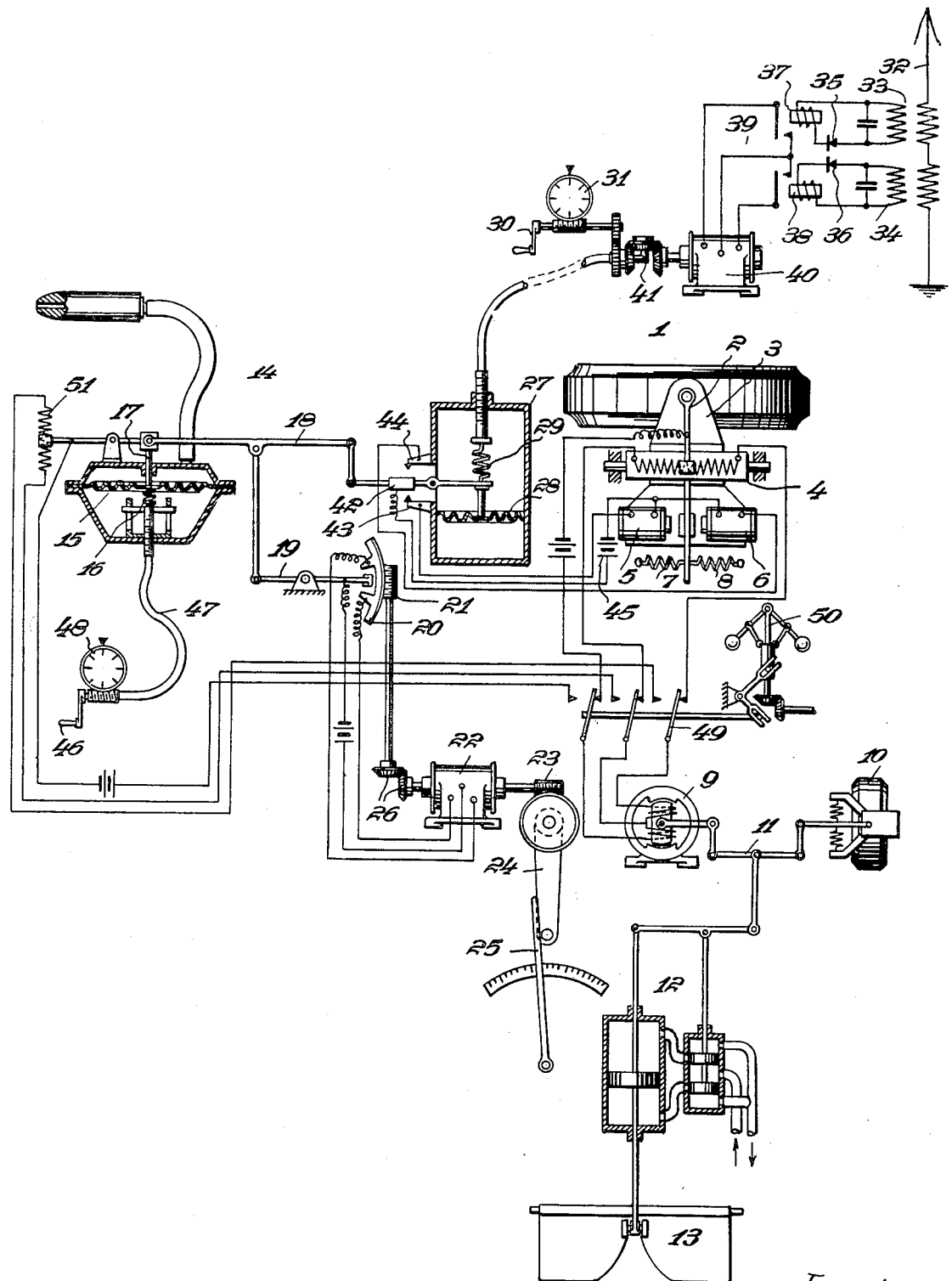
Inventor:
Eduard Fischel
by
Lotka & Kehlenbeck
Attorneys.

UNITED STATES PATENT OFFICE 2,191,250

SYSTEM FOR THE AUTOMATIC CONTROL OF AIRPLANES

Eduard Fischel, Berlin-Tempelhof, Germany, assignor to Siemens Apparate und · Maschinen Gesellschaft mit beschränkter Haftung, Berlin, Germany, a corporation of Germany Application September 4, 1935, Serial No. 39,120
In Germany September 24, 1934

13 Claims. (Cl. 244—76)

My invention relates to a system for the automatic control of airplanes, and particularly to means which permit to maintain the position and the speed of flight at a desired value without exposing the airplane to any danger.

Attempts have already been made to effect both a stabilization of the speed of flight and a stabilization of the position by means of the elevator. It is, however, evident that only one of these stabilizing effects may be attained with the aid of the elevator alone. In the first case the position of the airplane with respect to the transverse axis is subjected to changes whereas, on the other hand, the advantage is attained that the speed of the airplane is automatically maintained substantially constant. In the second case the longitudinal axis of the airplane is maintained automatically horizontal, which is in some cases desirable. In this case, however, the pilot is compelled to control the speed of the airplane. If this is overlooked and the speed drops below a predetermined value troubles may arise and under certain circumstances even a crash of the airplane may occur.

The object of the present invention is to overcome the above drawbacks by employing besides the elevator also the driving gear for the control and by making the elevator as to its adjustment dependent upon a clinometer, and the device for controlling the power of the driving gear dependent as to its adjustment upon a speedometer.

Another object of my invention consists in stabilizing the height of flight by making the adjustment of the driving gear dependent upon a speedometer and the adjustment of the elevator dependent upon a clinometer and an altimeter.

Another object of my invention consists—so as to maintain the position, the speed and the height of the airplane constant—in making the adjustment of the elevator dependent upon a clinometer and an altimeter and the adjustment of the driving gear dependent upon a speedometer and an altimeter, for which purposes the same altimeter may be employed.

Another object of my invention consists in causing an altimeter together with a speedometer to act constantly on the control of the driving gear and, in the case of the height differing considerably from the desired value, causing an altimeter further to act on an elevator which is constantly influenced by a clinometer.

Still another object of my invention consists in provisions whereby in the case of the driving gear power falling below a predetermined value a speedometer is caused to act on the elevator which in the case of a normal driving gear power is influenced by a clinometer.

Further details of my invention will be apparent from the following description in connection with the accompanying drawing which illustrates by way of example a system embodying my invention.

In the drawing 1 denotes a clinometer, for instance, a gyroscopic clinometer which is mounted in the airplane in such a manner that an inclination of the airplane about its transverse axis is indicated by a deflection of the indicator 2 relatively to the support 3 secured to the airplane which indicator is connected to one of the cardan shafts of the gyroscopic clinometer. The indicator 2 is designed in the form of a contact arm and the end thereof slides over a resistance 4 whose carrier may be shifted in longitudinal direction with the aid of two magnets 5 and 6 for a purpose hereinafter described. If the two magnets 5 and 6 are not energized the carrier assumes under the influence of the two springs 7 and 8 the central position shown. If the longitudinal axis of the airplane is in the horizontal position the contact arm 2 contacts with the center of the resistance 4, provided that the magnets 5 and 6 are not energized.

By means of the differential coil arrangement shown, the position of the contact arm 2 relatively to the resistance 4 is caused to give a corresponding angular position to a movable magnet 9 which in the usual manner acts, if desired, together with a turn indicator 10, through a differential lever 11 on the adjusting device, i. e., on the rudder actuating device 12 (servomotor) for the elevator 13. Since the rudder actuating device is in itself generally known the details thereof need not be fully described. 14 denotes a speedometer well known in the art and comprises a diaphragm 15 within a casing. The impact pressure of the relative wind acts on the one side of this diaphragm while the other side thereof is under the influence of an opposing force which is produced by a spring 16 as disclosed in the drawing and which may be adjusted by a mechanical, electrical, or, if desired, by a wireless transmission system. In the drawing an adjustment by hand is shown. The tension of the spring 16 is adjusted by turning the crank 46 to rotate the flexible shaft 47 connected with said spring, and the amount of such tension may be read off from a scale 48. The relative wind speed indicator is connected through a rod 17 to a differential lever 18 which in turn acts on the control arm 19. The latter plays with one end thereof between two counter-contacts whose carrier 20 is as hereinafter described adjustable by means of a worm wheel segment and a worm 21. An electric or hydraulic servo-motor 22 is controlled by means of the contact arm 19 and the contacts of the carrier 20, the servomotor 22 acting on the adjusting lever 25 by way of a worm gear 23 and an intermediate lever 24 and adjusting with the aid of the lever 25 a device for controlling the driving power control gear for instance a throttle.

As will be apparent from the above the system so far described is sufficient to produce the result for which my invention has been designed. As will be seen from the drawing the carrier 20 on which the two contacts for the control arm 19 are mounted is coupled to the servomotor 22 through the worm 21 and a bevel gear 26. In this manner a follow-up action is attained, by which the power is regulated in one or the other sense only to the extent to which the control arm 19 is moved in one or the other sense in accordance with its operating mechanism described.

As above mentioned an altimeter is connected according to the invention with respect to the adjusting device for the elevator 13 in parallel relation with the clinometer 1. The altimeter which may be of any suitable type is shown as a so-called statoscope 27 and is provided as in the case of the speedometer with a diaphragm 28 which closes an evacuated chamber and, consequently, adjusts itself in accordance with the atmospheric pressure and, therefore, in accordance with the altitude. The diaphragm may be biased by a spring 29, thus rendering it possible to predetermine the desired altitude of an airplane. The adjustment of the spring 29 may be effected by hand with the aid of the crank 30 according to the scale 31 or also with the aid of a remote transmitting system; for instance, of a wireless receiving set. The latter consists of an aerial 32 to which two oscillation circuits 33 and 34 are connected which are tuned to two different waves. The voltages appearing at the ends of the oscillation circuits are rectified by means of the detectors 35 and 36 and actuate the relay 37 or respectively in accordance with the length of the waves emitted from the transmitter. These relays close the circuits leading from an energy source 39 to a reversible motor 40 which effects the adjustment of the spring 29 arranged in the statoscope 27. A differential gear 41 permits the adjustment of the spring either manually or wirelessly as well as by both methods independently of one another.

The altimeter thus adjusted to its desired value acts on the elevator as follows: The lever 42 carries a contact which comes into engagement with a counter-contact 43 or 44 depending upon the difference of the altitude of flight from the desired value. In this manner a circuit fed by the energy source 45 is closed, which circuit energizes either the electromagnet 5 or 6 and thus shifts the carrier of the resistance 4 in the bearings thereof, so that a corresponding movement of the movable magnet 9 and, therefore, of the elevator 13 is attained by the adjustment of the resistance 4 relatively to the contact arm 2, independently of the movement of the gyroscope. When the airplane has been brought back to the desired altitude by these instrumentalities, the magnet circuit will be broken and the rudder returns to its position of rest.

In short, the operation of the system is as follows: The desired altitude is set by means of the remote transmitting system 32—39 or of the crank 30. Furthermore the desired speed of flight is set on the scale 48 with the aid of the crank 46, in addition to which a remote transfer system may, of course, also be provided. The airplane will then operate according to the desired values so set. As soon as the latter are obtained the speedometer 14 takes care of maintaining the desired speed and the altimeter 27 causes the airpane to maintain the proper altitude. At the same time the clinometer 1 stabilizes the "position" of the longitudinal axis of the airplane. If a different desired altitude is set with the aid of the crank 30 or of the remote transmitting system 32—39 or if for any reason the altitude of the airlane differs considerably from the desired value, then the control arm 42 comes into engagement with one or the other of the counter-contacts 43, 44 and thereby shifts the resistance 4 in the corresponding direction with the result that the airplane assumes the suitable inclination so as to overcome the difference in altitude.

According to another feature of the invention the control of the driving gear power may also be made dependent upon the position of the above-described altimeter or an altimeter of any other suitable type. To this end, the lever 42 of the statoscope 27 is connected to the differential lever 18, to the other end of which as above described is connected the speedometer 14. In this manner, the altimeter controls the driving gear continuously, whereas only an impulse is transmitted to the elevator if the actual altitude of flight differs from the desired altitude by a given amount.

According to still another feature of my invention, the entire stabilization is taken care of by the speedometer and elevator, if the power of the driving gear decreases below a predetermined value. As above described, it involves dangers to stabilize the airplane chiefly as to its position, if owing to a decrease in power of the driving gear, the speed decreases below a predetermined value. In order to change over the speedometer control of the driving gear to the control of the elevator in such a case a switch 49 is provided which is thrown over if the speed of the driving motor falls below a predetermined value. The changing over of the switch 49 may be effected by a centrifugal governor 50 actuated by the driving motor. After this change over the movable magnet 9 is no longer connected to the resistance 4, but to the resistance 51, over which a sliding brush 52 connected to the rod 17 of the speedometer 14 is shifted in accordance with the speed of flight.

It is to be understood that it is not necessary that the altimeter, speedometer and clinometer designated as measuring instruments be provided with indicating scales, since it is sufficient for the automatic control, if the measuring devices merely control without any indication being given.

I claim as my invention:

1. In a system for the automatic control of aircraft, an elevator, an altimeter and a clinometer, means for controlling said elevator and interconnected with said altimeter and clinometer to produce a resultant control value in response to the altimeter and clinometer reactions for adjusting the elevator for the desired altitude and inclination of the craft, a driving power control for said craft and means connected with said altimeter and said driving power control for exerting upon the driving power control an additional resultant control force commensurate with the resultant altimeter and clinometer control reactions upon the elevator to restabilize the craft in inclination and speed during variations in altitude.

2. In a system for the automatic control of aircraft, an elevator, an altimeter and a clinometer, means for controlling said elevator and interconnected with said altimeter and clinometer to produce a resultant control value in response to the altimeter and clinometer reactions for adjusting the elevator for the desired altitude and inclination of the craft, a driving power control for said craft and means reactive to the relative speed of the craft and interconnected with said altimeter and with said driving power control for exerting upon the driving power an additional resultant control force commensurate with the resultant altimeter and clinometer control reactions upon the elevator to restabilize the craft in inclination and speed during variations in altitude.

3. In a system for the automatic control of aircraft, an elevator, an altimeter and a clinometer, means for controlling said elevator and interconnected with said altimeter and clinometer to produce a resultant control value in response to the altimeter and clinometer reactions for adjusting the elevator for the desired altitude and inclination of the craft, means reactive to the relative speed of the craft, means for controlling the driving power of the craft and a differential connection between said two last mentioned means for exerting upon the driving power a control value resulting from the speed responsive means and altimeter reactions and commensurate with the resultant altimeter and clinometer reactions upon the elevator, to restabilize the craft in inclination and speed during variations in altitude.

4. In a system for the automatic control of aircraft, an elevator and a servometer for operating said elevator, an altimeter, a clinometer and a control element responsive to the combined reactions of said altimeter and clinometer for imposing upon said servomotor a resultant control value tending to adjust the elevator for the desired altitude and inclination of the craft, a speedometer, a servomotor for controlling the driving power of the craft and a differential lever connection between said speedometer and said altimeter and operatively associated with said power servometer for imposing upon said servomotor a control effect resulting from the combined speedometer and altimeter reactions and commensurate with the resultant altimeter and clinometer reactions upon the elevator servomotor to restabilize the craft in inclination and speed during variations in altitude.

5. In a system for the automatic control of aircraft, an elevator and a servomotor for operating said elevator, an altimeter, a clinometer and a control element responsive to the combined reactions of said altimeter and clinometer for imposing upon said servomotor a resultant control value tending to adjust the elevator for the desired altitude and inclination of the craft, a speedometer, a servomotor for controlling the driving power of the craft and a differential lever connection between said speedometer and said altimeter and operatively associated with said power servomotor for imposing upon said servomotor a control effect resulting from the combined speedometer and altimeter reactions and commensurate with the resultant altimeter and clinometer reactions upon the elevator servomotor to restabilize the craft in inclination and speed during variations in altitude, and switching means for the control element of the elevator servomotor for transferring the elevator control from the joint altimeter and clinometer control to the joint altimeter and speedometer control in case the driving power decreases below a desired value.

6. In a system for the automatic control of aircraft, an elevator and a servomotor for operating said elevator, an altimeter, a clinometer and a control element responsive to the combined reactions of said altimeter and clinometer for imposing upon said servomotor a resultant control value tending to adjust the elevator for the desired altitude and inclination of the craft, a speedometer, a servomotor for controlling the driving power of the craft and a differential lever connection between said speedometer and said altimeter and operatively associated with said power servomotor for imposing upon said servomotor a control effect resulting from the combined speedometer and altimeter reactions and commensurate with the resultant altimeter and clinometer reactions upon the elevator servomotor to restabilize the craft in inclination and speed during variations in altitude, and switching means for the control element of the elevator servomotor, responsive to the revolution member of the driving engine of the craft, for transferring the elevator control from the joint altimeter and clinometer control to the joint altimeter and speedometer control when the engine speed drops below a desired value.

7. In a system for the automatic control of aircraft, an elevator, an altimeter, a clinometer and means for controlling said elevator jointly from said clinometer and altimeter, said means comprising a movable contact arm operatively connected with said clinometer to respond to the latter's reactions to inclination variations of the craft, a resistance over which said contact arm is arranged to slide, a movable electromagnet arranged to actuate said elevator and a source of current connected in circuit with the coils of said magnet, with said contact arm and with said resistance to move the electromagnet in accordance with the resistance values adjusted by said contact arm due to the reactions of said clinometer, means connected with said altimeter for varying the position of said resistance with respect to the sliding direction of said contact arm to embody in the control of said movable electromagnet the altitude reactions of said altimeter, a driving power control for the craft and means connected with said altimeter and said power control for exerting upon the driving power an additional control force commensurate with the resultant altimeter and clinometer control reactions upon the elevator, to restabilize the craft in inclination and speed during variations in altitude.

8. In a system for the automatic control of aircraft, an elevator, an altimeter, a clinometer and means for controlling said elevator jointly from said clinometer and altimeter, said means comprising a movable contact arm operatively connected with said clinometer to respond to the latter's reactions to inclination variations of the craft, a resistance over which said contact arm is arranged to slide, a movable electromagnet arranged to actuate said elevator and a source of current connected in circuit with the coils of said magnet, with said contact arm and with said resistance to move the electromagnet in accordance with the resistance values adjusted by said contact arm due to the reactions of said clinometer, means connected with said altimeter for varying the position of said resistance with respect to the sliding direction of said contact arm to embody in the control of said movable electromagnet the altitude reactions of said altimeter, a driving power control for the craft, means reactive to the relative speed of the craft and interconnected with said altimeter and said driving power control for exerting upon the driving power an additional control force resultant from the reactions of said altimeter and speed-reactive means, and commensurate with the resultant altimeter and clinometer control reactions upon the elevator, to restabilize the craft in inclination and speed during variations in altitude.

9. A method of stabilizing aircraft during altitude variations consisting of controlling the craft elevator by a control force composed from a plurality of control forces responsive to altitude and inclination, and simultaneously imposing upon the power control of the craft an increment of control force composed from aforesaid altitude responsive control force and a craft speed responsive control force and of sufficient value to vary the speed of the craft commensurate with the effect produced by the resultant elevator control force upon the elevator.

10. A method of stabilizing aircraft during altitude variations consisting of controlling the craft elevator by a control force composed of control forces responsive to altitude and inclination and simultaneously controlling the craft power in accordance with the effect of said first-named force by a force responsive to craft speed and to said altitude.

11. A method of stabilizing aircraft during altitude variations consisting of controlling the craft elevator by an impulse which is a combination of impulses responsive to altitude and to inclination, and simultaneously controlling the craft power by an impulse responsive to said altitude.

12. A method of stabilizing aircraft during altitude variations consisting of controlling the craft elevator by an impulse which is a combination of impulses responsive to altitude and to inclination, and simultaneously controlling the craft power by an impulse which is a combination of impulses responsive to craft speed and to said altitude.

13. A method of stabilizing aircraft during altitude variations consisting of controlling the craft elevator by impulses responsive to altitude and inclination and simultaneously controlling the craft power by impulses responsive to speed and to said altitude.

EDUARD FISCHEL.